United States Patent
Voelker

(10) Patent No.: US 11,154,916 B2
(45) Date of Patent: Oct. 26, 2021

(54) METHOD FOR CLEANING A SOLDER NOZZLE OF A SOLDERING SYSTEM

(71) Applicant: ERSA GmbH, Wertheim (DE)

(72) Inventor: Stefan Voelker, Hafenlohr (DE)

(73) Assignee: ERSA GmbH, Wertheim (DE)

( * ) Notice: Subject to any disclaimer, the term of this patent is extended or adjusted under 35 U.S.C. 154(b) by 100 days.

(21) Appl. No.: 16/628,093

(22) PCT Filed: Jul. 2, 2018

(86) PCT No.: PCT/EP2018/067794
§ 371 (c)(1),
(2) Date: Jan. 2, 2020

(87) PCT Pub. No.: WO2019/007900
PCT Pub. Date: Jan. 10, 2019

(65) Prior Publication Data
US 2021/0138515 A1 May 13, 2021

(30) Foreign Application Priority Data
Jul. 3, 2017 (DE) .................... 10 2017 114 801.9

(51) Int. Cl.
*B23K 3/00* (2006.01)
*B08B 9/023* (2006.01)
(Continued)

(52) U.S. Cl.
CPC .............. *B08B 9/023* (2013.01); *B08B 13/00* (2013.01); *B23K 1/085* (2013.01); *B23K 3/0653* (2013.01)

(58) Field of Classification Search
CPC ......... B08B 9/023; B08B 13/00; B08B 9/032; B08B 9/02; B23K 1/085; B23K 3/0653;
(Continued)

(56) References Cited

U.S. PATENT DOCUMENTS 4,886,201 A * 12/1989 Deambrosio ........ B23K 3/0653
228/37
5,156,324 A * 10/1992 Hueste ................... B23K 1/085
228/180.1
(Continued)

FOREIGN PATENT DOCUMENTS

| DE | 10243769 A1 | 4/2003 |
| DE | 10353936 B3 | 5/2005 |
| DE | 202009002666 U1 | 4/2009 |

OTHER PUBLICATIONS

Non-translated German Office Action dated Jul. 4, 2017, pp. 1-5.
(Continued)

*Primary Examiner* — Kiley S Stoner
(74) *Attorney, Agent, or Firm* — Bond Schoeneck & King, PLLC; George McGuire

(57) ABSTRACT

The invention relates to a method for operating a soldering system for selective wave soldering comprising at least one solder crucible, the solder crucible comprising a solder reservoir, a solder nozzle and a solder pump, the solder pump being designed to guide the liquid solder out from the solder reservoir through the solder nozzle for generating a standing wave from liquid solder. The invention relates, in particular, to a method for cleaning a solder nozzle comprising the following steps: conveying solder from the solder reservoir at a first pump capacity which is adjusted in such a way that a standing wave of liquid solder is generated at a solder level which is below an upper edge of the nozzle outlet of the solder nozzle; introducing a cleaning agent into the nozzle outlet of the solder nozzle; increasing the pumping capacity of the solder pump to a second pump capacity such that the cleaning agent flows over the upper edge of the nozzle such that the cleaning agent is guided to an outer side of the solder nozzle.

10 Claims, 4 Drawing Sheets

(51) Int. Cl.
  *B08B 13/00* (2006.01)
  *B23K 1/08* (2006.01)
  *B23K 3/06* (2006.01)

(58) Field of Classification Search
  CPC .......... B23K 3/08; B23K 1/206; B23K 3/028; H05K 3/34
  USPC ................. 228/201, 205, 260–261, 37
  See application file for complete search history.

(56) References Cited

U.S. PATENT DOCUMENTS

| | | | | |
|---|---|---|---|---|
| 6,364,195 B1* | 4/2002 | Masuda | ............... | B23K 3/0653 228/37 |
| 7,124,882 B1* | 10/2006 | Jadydy | ................... | B08B 9/021 206/234 |
| 2011/0284619 A1* | 11/2011 | Sato | .................... | H05K 3/3468 228/36 |
| 2015/0343546 A1* | 12/2015 | Herz | ................... | B23K 3/0646 134/1 |
| 2016/0236248 A1* | 8/2016 | Iwasaki | ................. | G02B 23/24 |
| 2017/0153263 A1* | 6/2017 | Mizuki | ................. | G01N 35/10 |

OTHER PUBLICATIONS

International Search Report and Non-Translated Written Opinion Form PCT/IS/210 and PCT/ISA/237, International Application No. PCT/EP2018/067794, pp. 1-6, International Filing Date Jul. 2, 2018, dated Dec. 20, 2018.

* cited by examiner

METHOD FOR CLEANING A SOLDER NOZZLE OF A SOLDERING SYSTEM

CROSS-REFERENCES TO RELATED APPLICATIONS

This application is a national stage application under 35 U.S.C. 371 based on international patent application PCT/EP2018/067794 filed on Jul. 2, 2018, which claims priority to German Patent Application No. 10 2017 114 801.9 filed on Jul. 3, 2017, disclosures of both of which are incorporated herein by reference in their entireties.

BACKGROUND OF THE INVENTION

The invention relates to a method for cleaning a solder nozzle of a soldering system for selective wave soldering, the soldering system comprising a solder crucible comprising a solder reservoir, a solder nozzle and a solder pump, the solder pump being designed to guide liquid solder out from the solder reservoir through the solder nozzle for generating a standing wave from liquid solder.

Soldering systems for selective wave soldering are well known. In soldering systems for selective wave soldering, an underside of a printed circuit board or contact pins of electronic components that are inserted through the printed circuit board from the upper side are soldered by means of a standing wave of liquid solder.

DE 20 2009 002 666 U1 discloses a device for cleaning and/or activating solder nozzles in which cleaning agent is transported to a solder nozzle and applied to the solder nozzle. DE 103 53 936 B3 discloses a method for removing oxidation residues of a solder. DE 102 43 769 A1 discloses a device for measuring the height of a solder wave.

To generate the standing wave, liquid solder from a solder reservoir of a solder crucible is conveyed through the solder nozzle by means of a solder pump, such that the standing wave is formed. The solder crucible can then be moved in a numerically controlled manner along a predefined path of a soldering program, the standing wave contacting the printed circuit board from the underside thereof.

In solder nozzles of soldering systems for selective wave soldering, the problem arises whereby, over time, the solder nozzles change their original properties and contaminate; they are subject to what is known as a "deactivation process." Such a "deactivation process" can be triggered, for example, by high temperatures, by soiling, which is caused by deposits on a solder joint, by erosion of solder resist and printed circuit board material, and by a variable nitrogen atmosphere and floating oxides.

Owing to such a "deactivation process" of the solder nozzle, the soldering quality of a soldering system for selective wave soldering can fluctuate, it being possible for failures of soldered workpieces to occur due to poor solder joints.

SUMMARY OF THE INVENTION

The object of the invention is therefore that of providing an alternative which can ensure a permanently high soldering quality, in which the solder nozzles of a soldering system for selective wave soldering should maintain a uniformly homogeneous wetting.

This object is achieved by a method for operating a soldering system for selective wave soldering.

The solder pump has a variable pump capacity.

Impurities on the outer side of the solder nozzle can be removed by the cleaning agent flowing over the upper edge of the nozzle outlet, and therefore a homogeneous wetting of the solder nozzle can be achieved again by means of such an "activation process."

Advantageously, the cleaning agent is powdered.

It has proved particularly advantageous in this case if the cleaning agent is liquefied and boiled after being introduced into the nozzle outlet. The liquefaction and boiling of the cleaning agent can be carried out advantageously by bringing the cleaning agent into contact with the liquid solder.

Furthermore, it is advantageous if the cleaning agent is liquefied before the pump capacity is increased.

A particularly advantageous development of the method provides that the cleaning agent is adipic acid.

According to a further advantageous embodiment of the method, it is provided that the pump capacity is increased incrementally or linearly from the first pump capacity to the second pump capacity.

It is conceivable here that the pump capacity is increased after a predetermined time interval has elapsed following the introduction of the cleaning agent. Preferably, the pump capacity is increased after a predetermined time interval of approximately 1 to approximately 20 seconds, more preferably from approximately 1 to approximately 10 seconds. Advantageously, the powdered adipic acid can be liquefied during this time interval. It is also possible for the pump capacity to be increased from the first pump capacity to the second pump capacity in a predetermined period of time. Preferably, the pump capacity is increased from the first pump capacity to the second pump capacity in a predetermined period of time from approximately 1 to approximately 20 seconds, more preferably from approximately 1 to approximately 10 seconds.

In order to be able to achieve a particularly thorough cleaning of the solder nozzle and thus also a uniformly homogeneous wetting of the solder nozzle, it has proved to be advantageous if the cleaning agent flows over the entire outer side of the solder nozzle, after the pump capacity is increased.

Advantageously, the cleaning agent breaks up deposits, in particular oxide deposits, on the outer side of the solder nozzle, in particular while flowing over the outer side of the solder nozzle.

In order to be able to ensure a consistently and permanently high soldering quality in a soldering system for selective wave soldering, it has proved to be advantageous for the method to take place in an automated manner in a predefined cleaning interval, after processing a predefined number of printed circuit boards and/or after visual assessment of the solder nozzle.

It is conceivable that the solder crucible is moved into a cleaning position in order to perform the method. In the cleaning position, the cleaning agent can then be automatically or manually introduced into the nozzle outlet.

Further details and advantageous developments can be found in the following description, on the basis of which an embodiment of the invention is described and explained in more detail.

DETAILED DESCRIPTION

Figure 1:
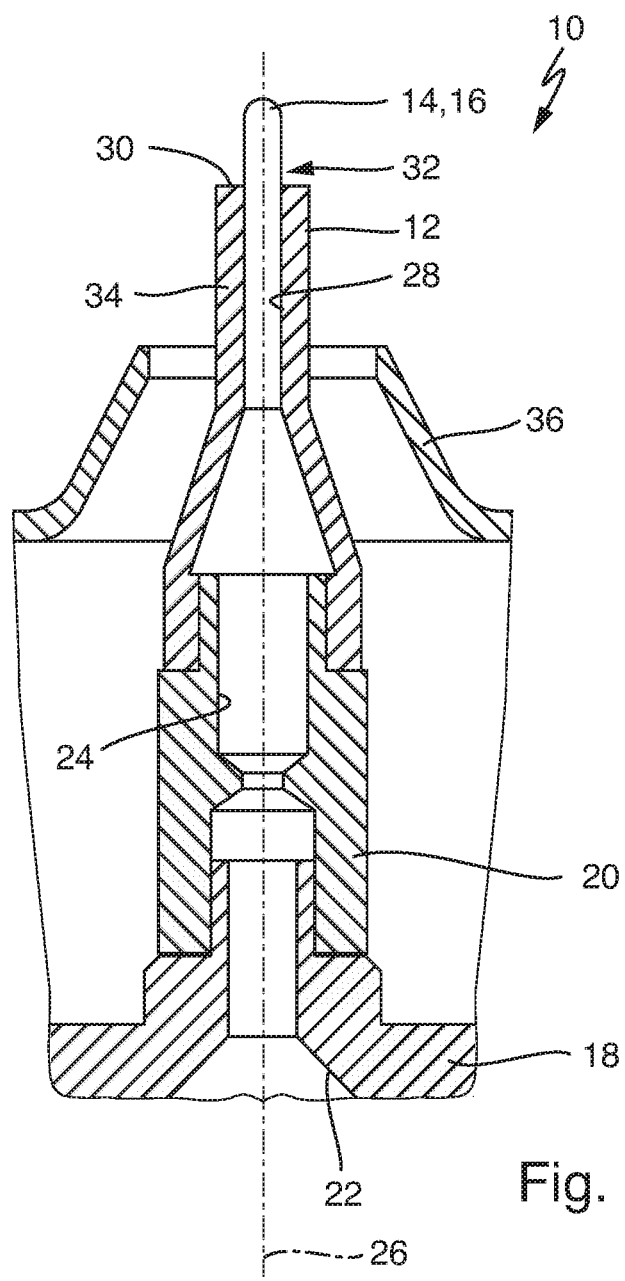
FIG. 1 shows a detail of a section through a solder crucible of a soldering system for selective wave soldering during operation of the solder crucible.

FIGS. 1 to 4 each show a detail of a section through a solder crucible 10 of a soldering system for selective wave soldering (not shown in its entirety in the drawings). Corresponding elements in FIGS. 1 to 4 are denoted by the corresponding reference signs.

The solder crucible 10 has a solder reservoir (not shown in the drawings), a solder nozzle 12 and a solder pump (not shown in the drawings either).

FIG. 1 shows the solder crucible 10 in operation, the solder pump, which is designed to convey liquid solder 14 from the solder reservoir through the solder nozzle 12, conveying the liquid solder 14 through the solder nozzle 12 such that a first standing wave 16 of liquid solder 14 is generated.

Using a first standing wave 16 of this type, in soldering systems for selective wave soldering, an underside of a printed circuit board or contact pins of electronic components inserted through the printed circuit board from the upper side can be soldered.
For this purpose, the solder crucible 10 can be moved in a numerically controlled manner along a predefined path of a soldering program.

In the solder nozzles 12 of the solder crucible 10 shown in FIGS. 1 to 4, the problem may arise whereby, over time, the solder nozzles 12 change their original properties and contaminate. This process is also referred to in expert fields as "deactivation process." Such a "deactivation process" can be triggered, for example, by high temperatures, by soiling, which is caused by deposits on a solder joint, by erosion of solder resist and printed circuit board material, and by a variable nitrogen atmosphere and floating oxides.

Owing to such a "deactivation process" of the solder nozzle, the soldering quality of a soldering system for selective wave soldering can fluctuate, it being possible for failures of soldered workpieces to occur due to poor solder joints.

As can be clearly seen in FIGS. 1 to 4, the solder crucible 10 has a base part 18 and a nozzle base 20 on which the solder nozzle 12 is arranged. The base part 18 has a channel 22, the nozzle base 20 also having a channel 24 which is arranged so as to be axially aligned with the channel 22 along a central axis 26 of the solder nozzle 12. The channel 20 of the nozzle base 20 is in turn arranged so as to be axially aligned along the central axis 26 of the solder nozzle 12 with respect to a channel 28 of the solder nozzle 12, which opens at an upper edge 30 of the solder nozzle in a nozzle outlet 32 having a circular cross-section. In the circumferential region of an outer side 34 of the solder nozzle 12, the solder nozzle 12 is surrounded by a cover 36 which is in the form of a tapered ring.

In order to ensure a permanently high soldering quality, the solder nozzle 12 of the soldering system for selective wave soldering should maintain a uniformly homogeneous wetting.

Figure 2:
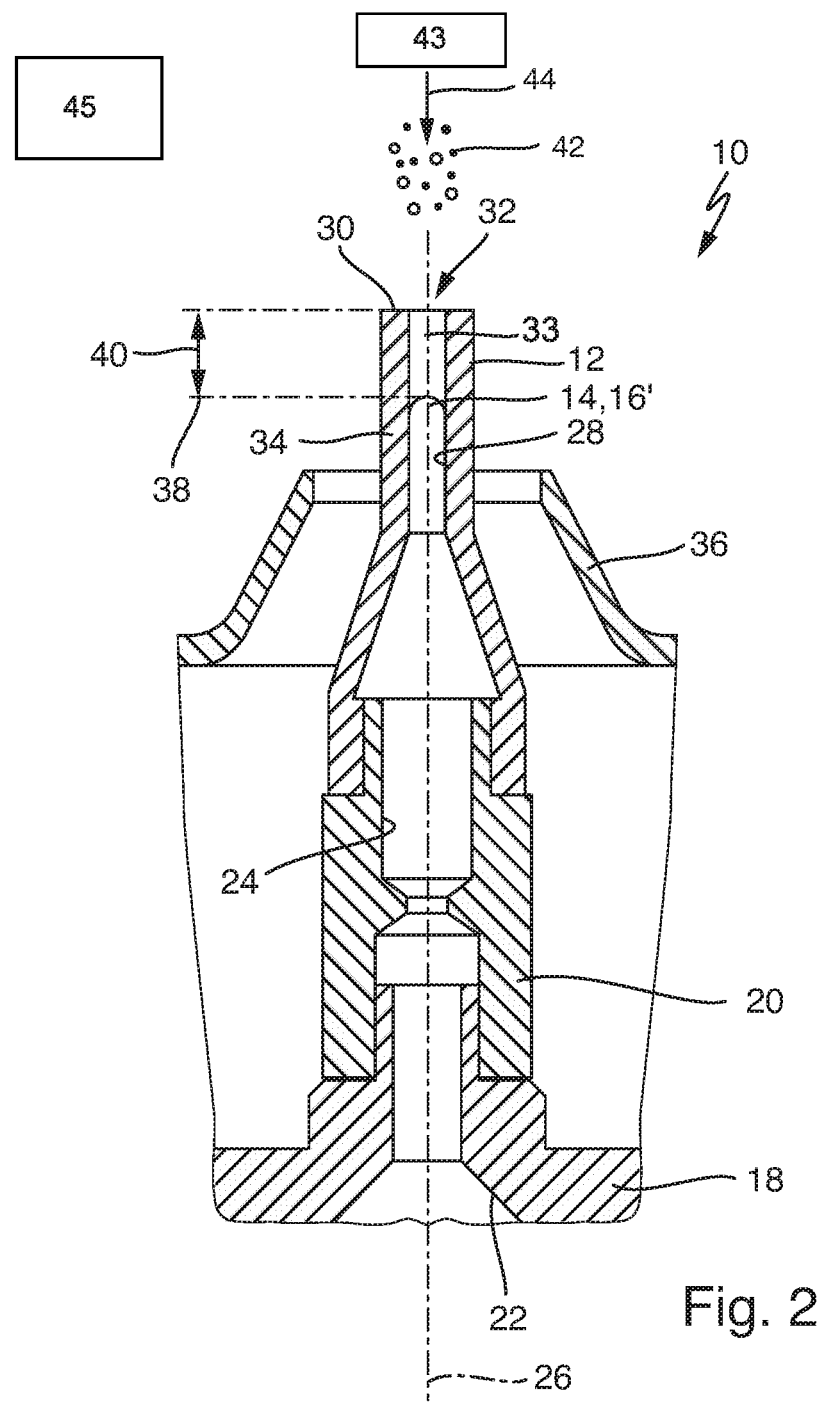
FIG. 2 shows the detail according to FIG. 1 when carrying out a first step of a method according to the invention.
Figure 3:
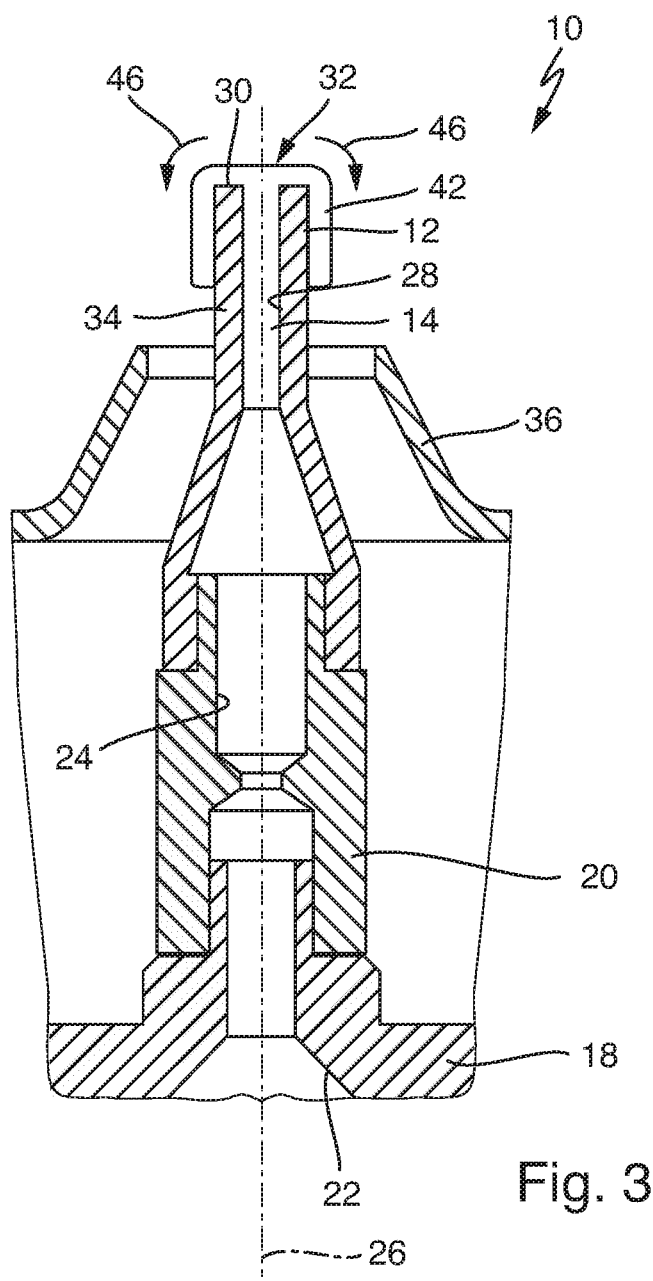
FIG. 3 shows the detail according to FIG. 1 when carrying out a method step following the step of FIG. 2.
Figure 4:
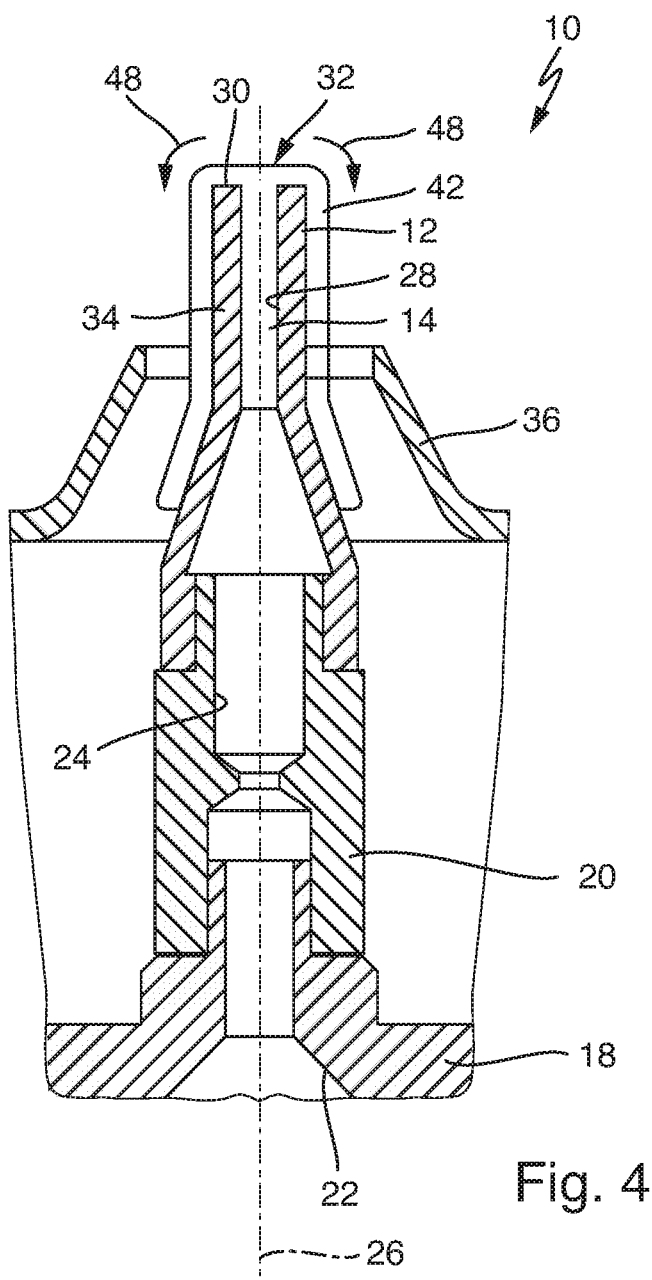
FIG. 4 shows the detail according to FIG. 1 when the method step of FIG. 3 is carried out at a time interval from the state shown in FIG. 3.

FIGS. 2 to 4 therefore show various method steps of a method according to the invention for operating a soldering system for selective wave soldering, in particular of a method for cleaning a solder nozzle 12.

In the method step shown in FIG. 2, solder is conveyed from the solder reservoir at a first pump capacity which is adjusted in such a way that a second standing wave 16' of liquid solder 14 is generated at a solder level 38, which is at a distance 40 below the upper edge 30 of the nozzle outlet 32 of the solder nozzle 12.

In a subsequent method step, a cleaning agent in the form of powdered adipic acid 42 is introduced in the direction of the arrow 44 shown in FIG. 2 into the nozzle outlet 32 onto the second standing wave 16' in the solder nozzle 12.

After introduction of the powdered adipic acid 42 into the nozzle outlet 32, the adipic acid 42 is liquefied and boiled by contact with the hot solder 14.

Subsequently, the pump capacity of the solder pump is increased incrementally or linearly after a predetermined time interval has elapsed following the introduction of the adipic acid 42. This increase takes place in particular in a predetermined period of time.

In the process, the pump capacity is increased to the second pump capacity such that the liquefied and boiled adipic acid 42 flows over the upper edge 30 of the nozzle outlet 32 in such a way that the adipic acid 42 is guided to the outer side 34 of the solder nozzle 12 in the direction of the arrows 46 shown in FIG. 3.

As shown in FIG. 4, the liquefied and boiled adipic acid 42 flows out over the entire outer side 34 of the solder nozzle 12 in the direction of the arrows 48, impurities on the outer side 34 of the solder nozzle 12 being removed. The adipic acid 42 breaks up deposits, in particular oxide deposits, on the outer side 34 of the solder nozzle 12 while flowing over the outer side 34 of the solder nozzle 12.

Such an "activation process" means that a homogeneous wetting of the solder nozzle 12 can be achieved again. In order to be able to ensure a consistently and permanently high soldering quality in a soldering system for selective wave soldering, the method can take place in an automated manner in a predefined cleaning interval, after processing a predefined number of printed circuit boards and/or after visual assessment of the solder nozzle 12.

It is conceivable that the solder crucible 10 is moved into a cleaning position within the soldering system in order to perform the method, it being possible for the adipic acid 42 in the cleaning position to be introduced into the nozzle outlet 32 automatically by means of a metering device (not shown in the drawings) or manually by an operator.

The invention claimed is:

1. Method for cleaning a solder nozzle of a soldering system for selective wave soldering, wherein the soldering system comprises at least one solder crucible having a solder reservoir, the solder nozzle and a solder pump, wherein the solder pump is designed to guide liquid solder out from the solder reservoir through the solder nozzle for generating a standing first wave from liquid solder, comprising the following steps:
   conveying solder from the solder reservoir at a first pump capacity which is adjusted in such a way that a second standing wave of liquid solder is generated at a solder level which is below an upper edge of a nozzle outlet of the solder nozzle;
   introducing a cleaning agent into the nozzle outlet of the solder nozzle onto the second standing wave, as a result of which the cleaning agent is liquefied;
   increasing the pump capacity of the solder pump to a second pump capacity, so that the cleaning agent flows over the upper edge of the nozzle outlet such that the cleaning agent is guided to an outer side of the solder nozzle.

2. Method according to claim 1, wherein the cleaning agent is powdered.

3. Method according to claim 1, wherein the cleaning agent is boiled after being introduced into the nozzle outlet.

4. Method according to claim 1, wherein the cleaning agent is adipic acid.

5. Method according to claim 1, wherein the pump capacity is increased incrementally or linearly from the first pump capacity to the second pump capacity.

6. Method according to claim 1, wherein the pump capacity is increased after a predetermined time interval has elapsed following the introduction of the cleaning agent.

7. Method according to claim 1, wherein, after the pump capacity has been increased, the cleaning agent flows over the entire outer side of the solder nozzle.

8. Method according to claim 1, wherein the cleaning agent breaks up deposits on the outer side of the solder nozzle.

9. Method according to claim 1, wherein the method is automated in a predefined cleaning interval, after processing a predetermined number of printed circuit boards and/or after visual assessment of the solder nozzle.

10. Method according to claim 1, wherein the solder crucible is moved into a cleaning position in order to perform the method.

* * * * *